United States Patent [19]

Seizert

[11] Patent Number: 5,044,663

[45] Date of Patent: Sep. 3, 1991

[54] BLOW MOLDED AIRBAG WITH FABRIC REINFORCEMENTS

[75] Inventor: Robert D. Seizert, Canton, Mich.

[73] Assignee: Solvay Automotive, Inc., Houston, Tex.

[21] Appl. No.: 479,082

[22] Filed: Feb. 12, 1990

[51] Int. Cl.[5] ............................................. B60R 21/22
[52] U.S. Cl. ..................................... 280/730; 280/731; 280/732; 280/743; 264/515; 264/516
[58] Field of Search ............... 280/727, 728, 729, 730, 280/731, 732, 743; 383/3, 100, 103; 264/515, 516

[56] References Cited

U.S. PATENT DOCUMENTS

| | | | |
|---|---|---|---|
| 3,831,972 | 8/1974 | Allgaier et al. | 280/730 |
| 3,837,669 | 9/1974 | Nagazumi et al. | 280/733 |
| 3,853,334 | 10/1974 | Auman et al. | 280/728 |
| 3,887,215 | 6/1975 | Albrecht et al. | 280/730 |
| 3,907,330 | 9/1975 | Kondo et al. | 280/731 |
| 3,937,488 | 2/1976 | Wilson et al. | 280/743 X |
| 3,982,774 | 9/1976 | Ivashuk et al. | 280/737 |
| 4,325,568 | 4/1982 | Clark et al. | 280/731 |
| 4,334,699 | 6/1982 | Patzelt et al. | 280/731 |
| 4,830,401 | 5/1989 | Honda | 280/736 |
| 4,887,842 | 12/1989 | Sato | 280/743 X |

FOREIGN PATENT DOCUMENTS

| | | | |
|---|---|---|---|
| 122533 | 9/1979 | Japan | 280/743 |
| 122751 | 5/1989 | Japan | 280/743 |

Primary Examiner—Charles A. Marmor
Assistant Examiner—Tamara L. Finlay
Attorney, Agent, or Firm—Willian Brinks Olds Hofer Gilson & Lione

[57] ABSTRACT

An improved thermoplastic airbag for application in motor vehicle occupant restraint systems is disclosed. The blow molded thermoplastic airbag includes at least one reinforcement insert encapsulated at a preselected area on the exterior surface of the airbag. The reinforcement insert providing supplemental support during inflation of the airbag.

30 Claims, 3 Drawing Sheets

BLOW MOLDED AIRBAG WITH FABRIC REINFORCEMENTS

BACKGROUND OF THE INVENTION

1. Field of the Invention

This invention relates generally to occupant restraint systems for motor vehicles and, more particularly, to a blow molded airbag with fabric reinforcements.

2. Description of Related Art

With the advent of more stringent vehicle safety standards promulgated by governmental agencies, advanced occupant restraint systems for motor vehicles are being developed by the vehicle manufacturers. More specifically, technology currently exists for occupant restraint systems that include cushioning devices commonly referred to as "airbags". These systems are designed to deploy an airbag from a folded inoperative position into an inflated operative position in order to cushion the vehicle operator and passenger in the event of a collision. Upon inflation, the airbag intervenes between the vehicle occupants and structural components such as the windshield, instrument panel, and steering wheel. The shock and impact that would otherwise be totally imparted to the vehicle occupants as a result of the collision condition can thus be absorbed or dampened by inflation of the airbag.

Generally, such systems include a pressure fluid source of any conventional type, such as stored gas, gas generating or a hybrid thereof. The source may be mounted on the steering wheel or the steering column, or may be mounted remote from either and connected for communication with the inflatable airbag. Sensors which actuate the pressure fluid source are normally mounted remote from the vehicle cabin in order to instantaneously sense any impact received by the vehicle or the probability or possibility of such impact upon rapid deceleration.

Conventionally, the airbag is located in a recess in a central portion of the steering wheel and is held in its inoperative "deflated" state by a cover member. Numerous concepts are known in the industry for permitting the cover member to break away or rupture during inflation of the airbag. Likewise, airbag restraint systems are available which are designed to protect vehicle passengers other than the driver from injury during a collision. Such systems are generally provided in the dashboard structure directly facing a front seat passenger. Again, numerous systems are now known in the automotive industry in this regard.

Airbag restraint systems, while proven to be effective, are extremely expensive. Motor vehicle manufacturers have been reluctant to install airbag restraint systems because the expense must be normally passed on to the consumer. Presently, the majority of airbags installed in motor vehicles are fabricated from a multi-piece fabric material and are very expensive to manufacture. Typically, the fabric airbags include upper and lower circular walls of a coated fabric material which are secured together (i.e. sewn) at their common peripheral edge.

3. Summary of the Invention

Briefly stated, the present invention is an improvement over conventional passenger restraint systems employing fabric airbags. The present invention encompasses application of blow molded plastic airbags which have fabric reinforements encapsulated thereon. Blow molded airbags can be fabricated for a fraction of the cost associated with conventional fabric airbags. Moreover, the reinforced plastic airbags are a direct alternative to conventional fabric bags. As such, the plastic airbags may be disposed within a steering wheel restraint system to protect the driver and, likewise, may be mounted within the vehicle dashboard to protect a passenger.

The improved airbag comprises a one-piece blow molded thermoplastic airbag having at least one fabric reinforcement insert encapsulated on a localized area thereof to provide supplemental structural support upon inflation. Additionally, the present invention includes a blow molded airbag which is tethered for controlled inflation. A fabric reinforcement pad encapsulated on the airbag and to which tethers are mounted permits an improved deployment pattern which "surrounds" the occupant. In this manner, the occupant is inhibited from "bouncing-off" the airbag which is a concern associated with conventional fabric airbag restraint systems.

Accordingly, it is an object of the present invention i to provide a one-piece blow molded airbag which can be readily integrated into existing occupant restraint systems as a design alternative to conventional coated fabric airbags.

Another object of the present invention is to provide a new and improved blow molded airbag having at least one reinforced fabric insert encapsulated at a preselected position to provide supplemental structural integrity to the airbag upon inflation.

It is still another object of the present invention to provide an airbag which is simple in construction and which is suitable for installation in the limited space of motor vehicles. The improved airbag is a simple one-piece blow molded structure which can be economically manufactured in a commercial production environment.

Other objects, features and advantages of the present invention will become apparent from the subsequent description and the appended claims taken in conjunction with the accompanying drawings.

DETAILED DESCRIPTION OF THE PREFERRED EMBODIMENT

Figure 1:
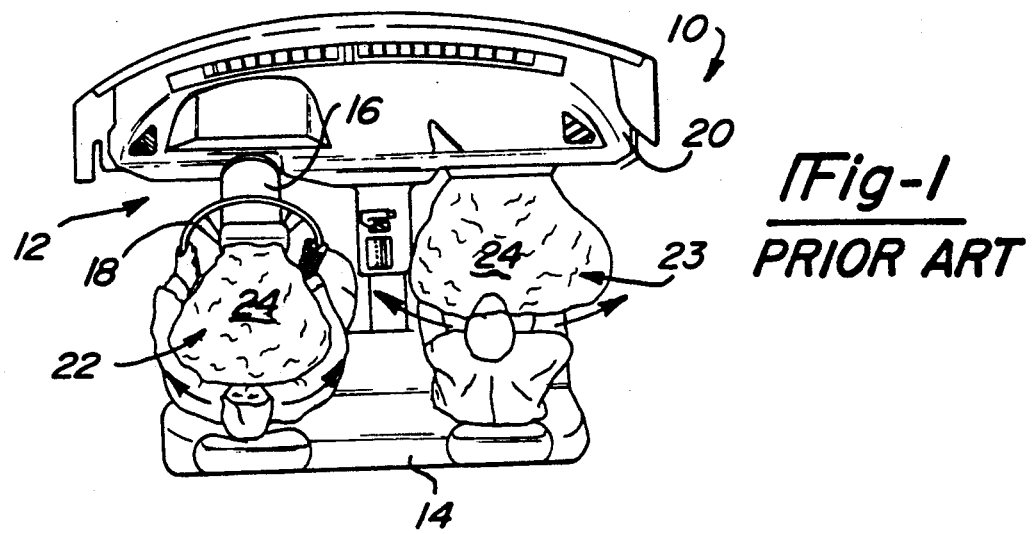
FIG. 1 is a top schematic view of the deployment pattern of conventional automotive airbag occupant restraint systems known in the prior art.

Referring now to the drawings wherein like reference numerals are used throughout the various views to designate like parts, an automotive vehicle designated generally as numeral 10 includes an occupant compartment 12 having a conventional front seat 14 for supporting a driver and a passenger in a seated attitude. A steering column assembly 16, of the energy absorbing type, is conventionally mounted in the vehicle occupant compartment 12 and has a steering wheel 18 mounted at its rearward or upper end for use by the driver in steering the vehicle. A conventional automotive dashboard 20 is also provided within compartment 12. An inflatable airbag occupant restraint assembly 22 is mounted within a hub or cavity provided in steering column assembly 16 or steering wheel 18. Likewise, a second airbag restraint assembly 23 is mounted within dashboard 20. As is apparent from FIG. 1, it is possible for the occupants to "glance-off" the gas cushioning devices ("airbags") upon impact. Such deployment is undesirable since it may permit injury from collision with door structure or between the occupants themselves.

Restraint systems 22 and 23 generally include a prior art fabric airbag 24 and a pressure fluid source preferably a gas generator (not shown). It is known in the art that gas generators can be electrically actuated from a conventional power source, such as a vehicle battery or a capacitor charged by the battery. Typically, the gas generator is actuated when an acceleration responsive sensor, a velocity responsive sensor, or any other conventional sensor device is actuated by impact of vehicle 10 with an obstacle. Such sensors, as well as the monitoring and the control circuits for the sensors, are well known in the airbag occupant restraint system industry.

The prior art airbags 24 which are installed on vehicles are formed of either a non-porous material such as a neoprene coated dacron which is provided with one or more pressure relief valving arrangements or from a fabric type semi-porous material. Airbags 24 are fabricated from a plurality of separate pieces which must be sewn or adhesively bonded together. As such, airbags 24 are very expensive to manufacture which is a cost that is eventually passed on to the consumer. Therefore, according to a preferred embodiment of the present invention, at least one fabric reinforcement insert is encapsulated on a preselected localized area of a blow molded airbag.

Figure 2:
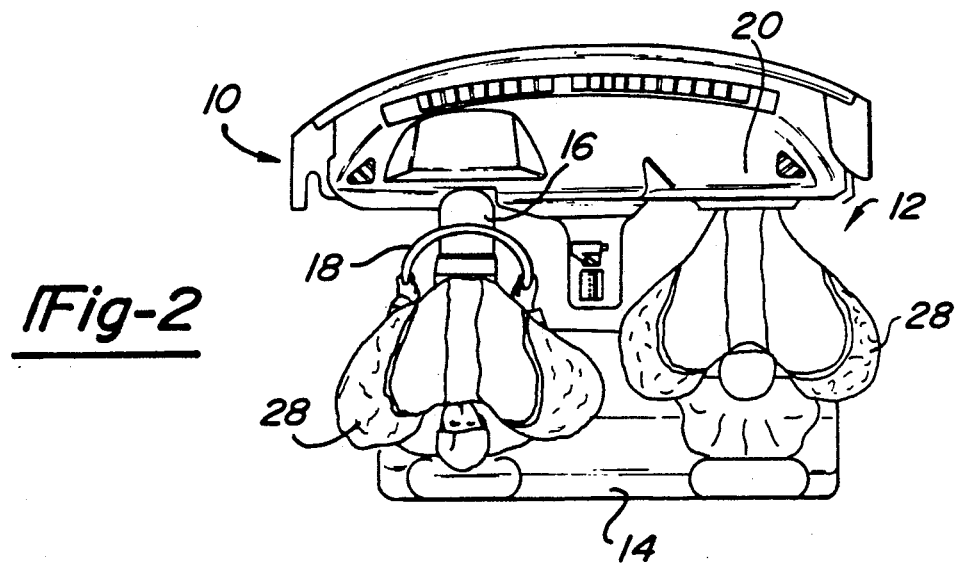
FIG. 2 is a top schematic view, partially broken away, illustrating an improved airbag occupant restraint system embodying the principles of the present invention in combination with a vehicle steering column assembly and dashboard, the improved airbag being shown in its deployed condition relative to an occupant.
Figure 3:
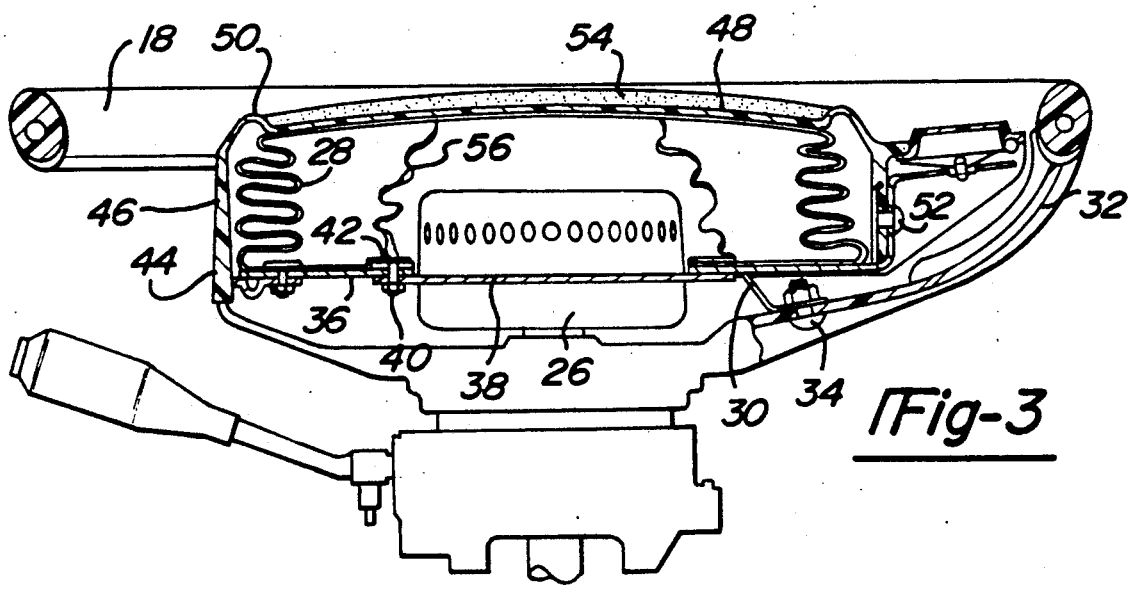
FIG. 3 is a sectional view of a representative steering wheel illustrating the operative association of the improved airbag within a steering wheel airbag restraint system.
Figure 4:
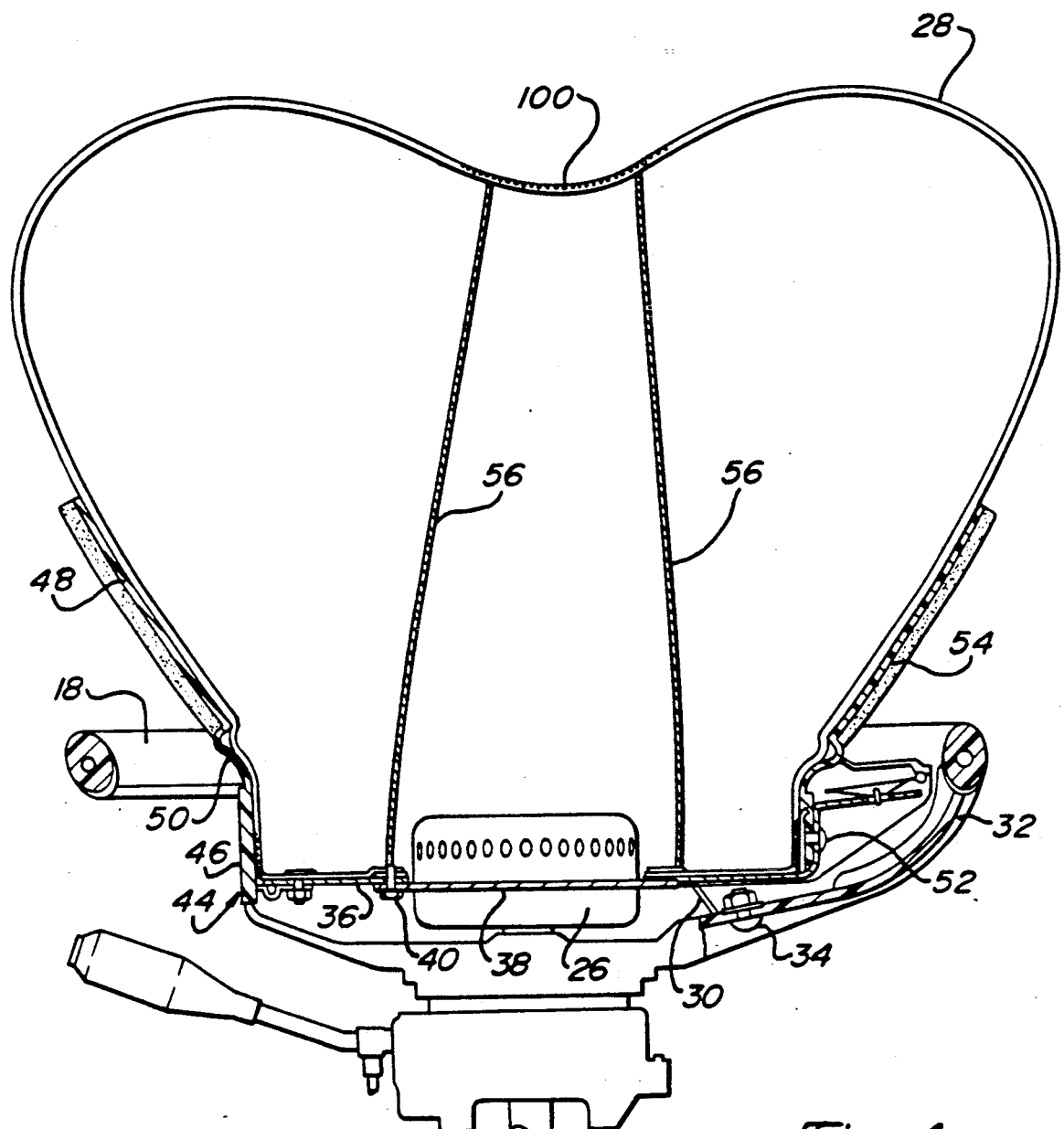
FIG. 4 is a sectional view similar to FIG. 3 illustrating the improved airbag in a fully deployed condition.

Referring now to FIGS. 2 through 4, the improved blow molded airbag 28 fabricated according to the preferred embodiment of the present invention is illustrated in operative association with an occupant airbag restraint system. A bracket 30 is arranged at a central portion of steering wheel 18 and is secured to at least one spoke 32 of steering wheel 18 such as through bolt 34. Gas generator 26 and airbag 28 are arranged at a generally central portion 36 of bracket 30. A gas generator device 26 is secured to central portion 36 of bracket 30 by flange 38 and bolt 40. Airbag 28 is secured to bracket 30 through flange 38, bolt 40 and retainer 42. Airbag 28 is orientated to surround gas generator device 26 and is enclosed within housing 44 in a generally folded-up state. More specifically, a central generally circular aperture 29 is provided in the lowermost portion of airbag 28 for receipt of gas generator 26. Aperture 29 may be molded into blow molded airbag 28, or may be punched during subsequent finishing operations following the blow molding process.

Housing 44 is molded into the shape of a cap-like body which includes a side wall portion 46 formed to be relatively thick and a lid portion 48 formed to be generally thinner in cross-section than side wall portion 46. A thinned corner portion 50 connects side wall 46 and lid portion 48. Housing 44 is made of a plastic material such as polyethylene, polypropylene, ABS, or the like which is comparatively high in hardness so as to maintain the shape of the housing over the entire life of vehicle 10. Likewise, housing 44 must have good ductility to prevent airbag 28 from being damaged (i.e. torn) during inflation thereof. Housing 44 is attached to bracket 30, such as with screws 52, so as to enclose the airbag restraint system components thereunder. In the illustrated embodiment, the outside of lid portion 48 may include a decorative pad 54 bonded thereto.

As is shown in FIG. 4, actuation of gas generator device 26 in a conventional manner inflates airbag 28 to a full deployed configuration. The inflation procedure initiates a tearing or rupturing of lid portion 48 and pad 54 at predetermined areas of weakened cross-section (not shown) so as to provide a break-away pattern defined by the weakened areas. More specifically, lid surface portion 48 is bent outwardly to prevent the occupant from being hit by flying pieces of housing 44. Also, at least one and, preferably, two tether straps 56 are attached at one end to a centered portion of airbag 28, while their second ends are secured to the structure within the restraint system.

It should be understood that the present invention embodies an improved airbag design which can be installed in most vehicular "airbag" occupant restraint system currently known in the art and is not intended to be limited to any particular occupant restraint system, module or structure. Moreover, FIGS. 3 and 4 are provided only as representative illustrations of a conventional steering wheel restraint system in which the improved airbag 28 is readily installed as a substitute for the prior art airbag design.

Figure 5:
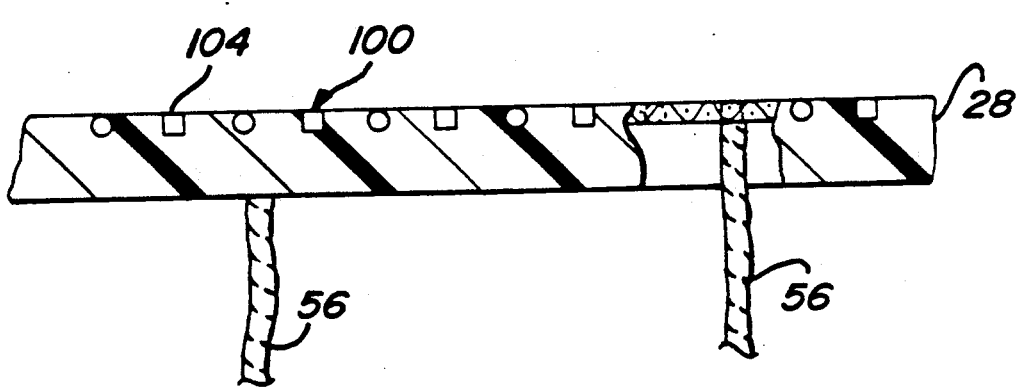
FIG. 5 illustrates a portion of the improved airbag having an encapsulated fabric reinforcement pad operatively associated with tether straps in accordance with a preferred embodiment of the present invention.

Referring now to FIG. 5, a portion of improved airbag 28 is shown. Specifically, airbag 28 is a blow molded, pressurizeable container fabricated from a thermoplastic material which can be readily folded (see FIG. 3) or, alternatively, fabricated with accordian-like fillets to be readily installed within vehicular space constraints. More specifically, at least one fabric reinforcing insert or pad 100 is encapsulated in a predetermined location on airbag 28 so as to be generally flush with an exterior surface thereof. Attached to reinforcement pad 100 are two tether straps 56 which are secured at their opposite end to structure within the restraint system, such as bracket 30. Upon inflation of airbag 28, tether straps 56 limit the direct inflation toward the occupants to thereby create a "wraparound" deployment.

Preferably, blow molded airbag 28 is fabricated from any thermoplastic material which is blow moldable and which meets all the required standards, specifications and physical properties associated with application to occupant restraint systems. Likewise, the reinforcing inserts can be made or fabricated from any woven or porous materials which will properly bond to the thermoplastic resin upon encapsulation. The insert threads or strands can be coated with a material or bonding agent to assure sufficient fabric encapsulation with the blow molding resin or compound.

Figure 6:
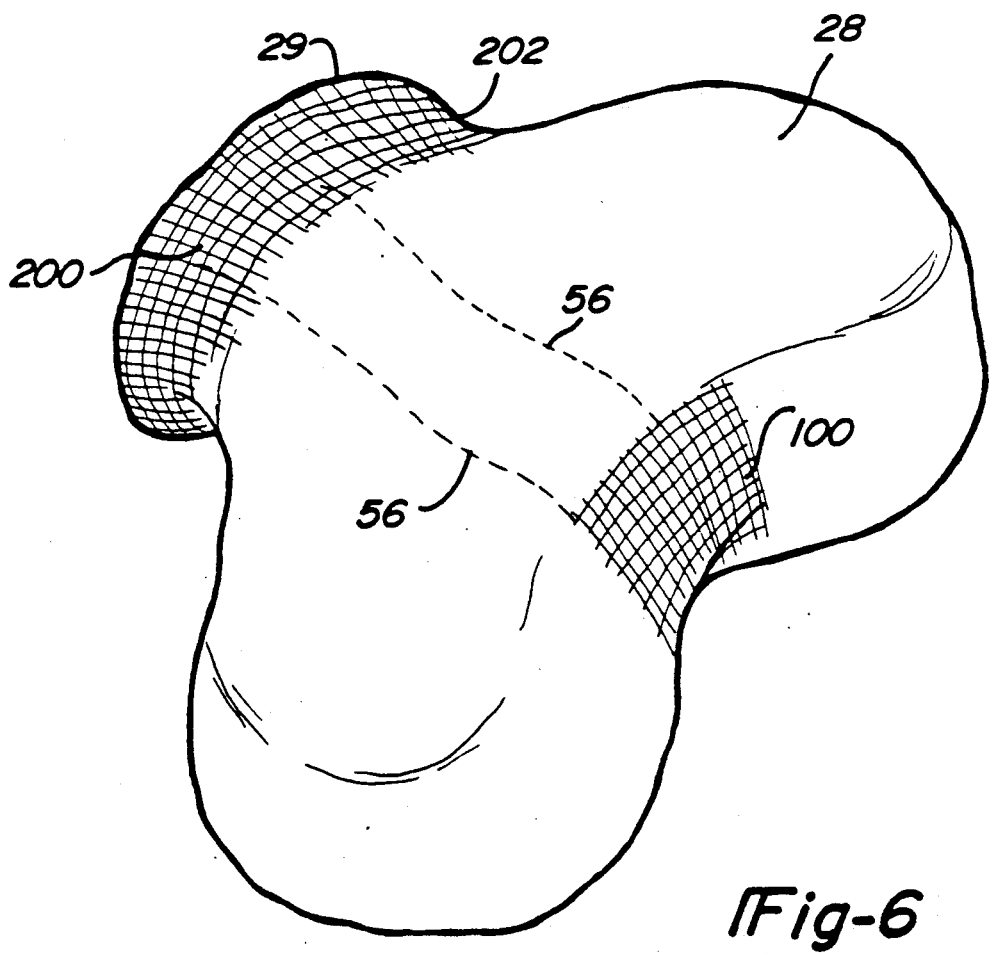
FIG. 6 is a perspective representation of the improved blow molded airbag having encapsulated fabric inserts provided at localized areas thereof.

Referring now to FIG. 6, a perspective view of blow molded airbag 28 in its deployed "inflated" position is shown. Fabric reinforcement insert 200 is illustrated as being encapsulated on airbag 28. Specifically, neck portion 202 of aperture 29 is a major area of airbag 28 which experiences sudden high pressure expansion force upon inflation. Preferably, insert 200 is a one-piece fabric which is encapsulated prior to cutting aperture 29 in airbag 28.

During blow mold processing, insert 100 and/or 200 will be encapsulated on an exterior surface of airbag 28 so as to give airbag 28 additional localized support and/or strength. The reinforcement insert provides localized strengthening which is beneficial during inflation where sudden increases in gas pressure can cause rupture at weak areas (e.g. at neck portion 202 of aperture 29 or at the peripheral edge). Furthermore, fabric reinforcement inserts permit an overall weight reduction through a reduction in the overall wall thickness because the reinforcements are preselectively encapsulated only where needed. In short, the mechanical properties of thermoplastic blow molded airbags are significantly improved by the inclusion of the encapsulated reinforcement inserts.

It is contemplated that fabric reinforcements 100 and 200 are a composite fabric weave which is added to, or draped in front of the blow mold inner wall surface prior to closing the blow mold. Thereafter, the thermoplastic parison will encapsulate the reinforcement to provide added strength and provide directional expansive control in the finished product. Directional control is accomplished through the use of a composite material or weave of materials having a "stretch" type fiber material interwoven generally transversely to a "rigid" strand material. In this manner, the orientation of the fabric insert within the mold will permit a degree of expansion along one axis while inhibiting expansion along a second orthogonal axis. In this manner, controlled deployment of the airbag in accordance with the preferred embodiment is permitted.

Alternatively, two different fabric composites for use as reinforcement inserts 100 and 200 can be used. The fabric weave structure of inserts 100 and 200 may differ to provide distinct characteristics which will be described in greater detail hereinafter. As noted, the inserts are added to the inner wall surface or draped in front of the inner wall surface of the mold prior to the expansion of the parison and are encapsulated in a generally flush, contiguous fashion with the external surface of airbag 28. Preselective placement of reinforcement inserts 100 and 200 within the mold, or relative thereto, provides localized reinforcement for increased mechanical rigidity and strength. Insert 200 preferably is a porous woven fabric having strands in one direction fabricated from a rigid or "strengthening" material and strands interwoven generally transversely thereto of a stretchable or "elastic" material. As such, the fabric weave would provide uni-directional strengthening characteristics along a first axis while providing flexural or expansive movement along a second axis. Selective orientation of the weave within the mold controls the characteristics which insert 200 will produce once encapsulated on airbag 28. It is contemplated, that insert 200 can be readily employed in localized areas such as "deep drawn" areas near neck 202 of aperture 29 or at the periphery where wall sections can possibly be of a reduced cross-section. Insert 100 is preferably a porous woven fabric having stretchable or "elastic" fibrous strands interwoven orthogonally to permit expansive movement with airbag 28 upon inflation thereof.

According to the preferred embodiment, the method for reinforcing airbag 28 will now be described. Generally, the present invention is an improvement over conventional blow mold processing and includes a method of making a hollow body (airbag) of a thermoplastic material in which a parison is expanded in a blow mold, and in which, during the course of the parison expansion process, wall portions of the parison penetrate between the alternating strands of the porous woven insert. More specifically, a mold configured to a definitive size and shape of the desired airbag is provided. The mold is opened so as to provide access to the interior wall surface thereof. Prior to the blow molding process, at least one woven fabric reinforcement insert is preselectively positioned on a surface of the mold which corresponds to a section of the finished airbag to be reinforced. Alternatively, the insert can be draped or suspended within the mold relative to a preselected surface thereof. As previously detailed, the orientation of the fibrous insert within the mold and the insert weave structure determines the direction and degree of reinforcement provided.

Reinforcement inserts are maintained in preselected positions upon the mold surface either through application of a vacuum, an adhesive or any other means known in the art. If a vacuum is provided, a suction-type clamping force maintains the reinforcement insert on the mold wall surface in the preselected position. Likewise, it is contemplated that an adhesive-type bonding material can be utilized which would not detrimentally react with the thermoplastic parison and which readily degradates during the blow molding process.

Once the fabric reinforcement insert has been oriented in its preselected position, parison is released to form a continuous tube of the preferred resin material. Thereafter the mold is closed so as to "pinch off" the parison to provide top and bottom sealed surfaces. The mold is then pressurized to expand the parison in the blow mold. The respective wall portions of the relatively fluidic parison penetrate the openings between the interwoven strands of porous reinforcement insert so as to encapsulate the insert relatively flush with the exterior surface of airbag 28. More specifically, FIG. 5 illustrates the general inter-relationship between strands 104 of insert 100 and an exterior surface of airbag 28. Furthermore, it is preferable that any frayed ends of the fabric inserts be completely encapsulated within the plastic material. According to conventional blow molding process practices, the mold is then opened and the airbag 28 is removed therefrom. Airbag 28 may then undergo various finishing operations known in the industry for removing flash or the like.

It is contemplated that the reinforced pressurized vessel (i.e. airbag) could be fabricated from any plastic material which provides the requisite strength required for application to motor vehicle airbag restraint systems. Likewise, it is contemplated that any woven reinforcement material having adequate porosity to permit proper encapsulation and which is capable of providing the requisite strengthening can be utilized. Moreover, woven inserts possessing bi-directional rigidity or flexibility can be used when specific applications arise.

The airbag illustrated in the drawings is for representative purposes only and the position, quantity and size of the fabric inserts shown should not be construed to limit the scope of the present invention. In short, localized areas identified as posing potential airbag rupture concerns are effectively reinforced pursuant to the present invention.

I claim:

1. A one-piece plastic airbag for use in a motor vehicle occupant restraint system comprising a continuous wall made from a blow molded plastic material and at least one reinforcement insert encapsulated on a preselected area of an exterior surface of said wall, said insert providing supplemental support at said preselected area during inflation of said airbag.

2. The blow molded plastic airbag of claim 1 wherein said airbag is a hollow one-piece inflatable vessel fabricated from a thermoplastic material.

3. The blow molded plastic airbag of claim 2 wherein said preselected area comprises localized areas of said airbag having a reduced wall thickness relative to the remainder of said airbag.

4. The blow molded plastic airbag of claim 2 wherein said preselected area comprises an area generally surrounding a central aperture provided in said airbag for permitting inflation thereof.

5. The blow molded plastic airbag of claim 4 wherein said preselected area additionally comprises an area generally opposite said central aperture provided in said airbag.

6. The blow molded plastic airbag of claim 2 wherein said preselected area comprises an area generally opposite a central aperture provided in said airbag, said preselected area provided for attaching at least one tether strap thereto for producing a wraparound deployment of said airbag upon inflation.

7. The blow molded plastic airbag of claim 6 wherein said at least one tether strap comprises two tether straps.

8. The blow molded plastic airbag of claim 2 wherein said reinforcement insert is comprised of a porous fabric material having a weave defining a plurality of openings between interwoven strands in said fabric, said openings being substantially filled with said thermoplastic material so as to encapsulate said fabric material in generally flush relation to said external surface of said airbag.

9. The blow molded plastic airbag of claim 6 wherein said fabric material is comprised of a composite weave having a first strand made from a generally rigid material and a second strand made from a generally elastic material, said first and second strands interwoven in a generally orthogonal orientation so as to provide uni-directional localized strengthening of said preselected area of said airbag along a first axis because of said first strand material and permitting expansion along a second axis because of said second strand material.

10. The blow molded plastic airbag of claim 8 wherein said fabric material is comprised of a composite weave having elastic, fibrous strands interwoven orthogonally for application in localized areas requiring supplemental reinforcement while permitting expansive support to said airbag upon inflation of said airbag.

11. A plastic airbag apparatus for use in motor vehicle occupant restraint systems comprising:
a hollow one-piece airbag having a continuous wall fabricated from a blow molded plastic material; and
a first reinforcement insert means for providing supplemental support to said airbag at a preselected area thereof, said first insert means encapsulated on an exterior surface of said airbag during blow mold fabrication of said airbag.

12. The plastic airbag apparatus of claim 11 further comprising a second reinforcement insert means for attaching at least one tether strap to said airbag, said second reinforcement insert means encapsulated on a preselected area of said exterior surface of said airbag and having said tether strap secured thereto for connection to structure within said occupant restraint system for controlling the deployment pattern of said airbag upon inflation.

13. The plastic airbag apparatus of claim 12 wherein said airbag is made from a blow molded thermoplastic material.

14. The plastic airbag apparatus of claim 13 wherein said first and second reinforcement insert means comprise a woven fabric insert defining a plurality of openings between interwoven strands of said fabric.

15. The plastic airbag apparatus of claim 14 wherein said woven fabric insert comprises a porous fabric material having a weave defining a plurality of openings between interwoven strands of said fabric material, said openings being generally filled with said thermoplastic material so as to encapsulate said fabric in generally flush relationship with said external surface of said airbag.

16. The plastic airbag apparatus of claim 15 wherein said first insert means is comprised of a composite weave having a first strand made from a generally rigid fibrous material and a second strand made from a generally elastic fibrous material, said first and second strands interwoven in generally orthogonal orientation so as to provide uni-directional localized strengthening of said preselected area of said airbag along a first axis and permitting elastic expansion along a second axis upon inflation of said airbag.

17. The plastic airbag apparatus of claim 12 wherein said first reinforcement insert means is placed in an area generally surrounding a central aperture provided in said airbag apparatus for permitting inflation of said airbag apparatus.

18. The plastic airbag apparatus of claim 17 wherein said second reinforcement means is encapsulated on said preselected area generally opposite said central aperture provided in said airbag.

19. The plastic airbag apparatus of claim 18 wherein said at least one tether strap comprises two tether straps.

20. An inflating type occupant restraint apparatus for a vehicle having an impact sensing device and a gas pressure generating source for actuating said apparatus in response to a signal generated from said sensing device, comprising:
an inflatable airbag in communication with said gas generating source so as to be inflated upon actuation thereof;
a support means for mounting said airbag within a passenger carrying compartment of said vehicle; and
a cover means for encasing said airbag in a generally deflated position prior to inflation thereof;
the improvement wherein said airbag comprises a hollow, one-piece pressurizable vessel comprising a continuous wall surface fabricated from a thermoplastic material, said airbag comprising at least one reinforcement insert encapsulated on an exterior of said surface for providing supplemental structural support to said airbag at preselected areas thereof.

21. The occupant restraint apparatus of claim 20 further comprising a second reinforcement insert for attaching at least one tether strap to said airbag, said second reinforcement insert having one end of said tether strap secured thereto.

22. The occupant restraint apparatus of claim 21 wherein said occupant restraint apparatus is secured to a hub member of a steering wheel assembly.

23. The occupant restraint apparatus of claim 21 wherein said apparatus is confined within a dashboard portion of said vehicle.

24. The occupant restraint apparatus of claim 21 wherein said at least one reinforcement insert is placed in an area generally surrounding a central aperture provided in said inflatable airbag for permitting inflation of said airbag.

25. The occupant restraint apparatus of claim 24 wherein said at least one reinforcement insert is comprised of a porous fabric material having a weave defining a plurality of openings between interwoven strands in said fabric, said openings being substantially filled with said thermoplastic material so as to encapsulate said fabric material in generally flush relation to said external surface of said airbag.

26. The occupant restraint apparatus of claim 25 wherein said fabric material is comprised of a composite weave having a first strand made from a generally rigid material and a second strand made from a generally elastic material, said first and second strands interwoven in a generally orthogonal orientation so as to provide uni-directional localized strengthening of said preselected area of said airbag along a first axis because of said first strand material and permitting expansion along a second axis because of said second strand material.

27. The occupant restraint apparatus of claim 25 wherein said at least one tether strap comprises two tether straps.

28. The occupant restraint apparatus of claim 24 wherein said second reinforcement insert is encapsulated on said preselected area generally opposite said central aperture provided in said airbag.

29. The occupant restraint apparatus of claim 28 wherein said second reinforcement insert is comprised of a composite weave having elastic, fibrous strands interwoven orthogonally for application in localized areas requiring supplemental reinforcement while permitting expansive support to said airbag upon inflation of said airbag.

30. A restraint apparatus of claim 20 wherein said wall surface is blow molded from said thermoplastic material.

* * * * *

UNITED STATES PATENT AND TRADEMARK OFFICE
CERTIFICATE OF CORRECTION

PATENT NO. : 5,044,663

DATED : September 3, 1991

INVENTOR(S) : Robert D. Seizert et al

It is certified that error appears in the above-identified patent and that said Letters Patent is hereby corrected as shown below:

Col. 1, line 62, delete "3. Summary of the Invention" and insert therefor -- SUMMARY OF THE INVENTION --.

Col. 2, line 22, after "invention" delete "i".

Claim 9, column 7, line 44, delete "6" and insert therefor -- 8 --.

Signed and Sealed this

Fourth Day of May, 1993

Attest:

MICHAEL K. KIRK

Attesting Officer

Acting Commissioner of Patents and Trademarks